United States Patent [19]

Pickles et al.

[11] 4,326,690

[45] Apr. 27, 1982

[54] SEAT ADJUSTING MECHANISM

[75] Inventors: Joseph Pickles, Birmingham; Chester S. Fudala, Troy, both of Mich.

[73] Assignee: Ferro Manufacturing Corporation, Southfield, Mich.

[21] Appl. No.: 35,495

[22] Filed: May 3, 1979

[51] Int. Cl.³ .............................................. B60N 1/02
[52] U.S. Cl. .................................. 248/396; 297/327; 297/345
[58] Field of Search ................ 248/396, 394; 297/346, 297/345, 327; 5/66, 68, 63

[56] References Cited

U.S. PATENT DOCUMENTS

| | | | |
|---|---|---|---|
| 2,397,092 | 3/1946 | Drexler et al. | 5/66 |
| 2,913,300 | 11/1959 | Darnell et al. | 5/68 |
| 2,924,265 | 2/1960 | Himka | 248/394 |
| 3,033,510 | 5/1962 | Hollar et al. | 248/394 |
| 3,437,302 | 4/1969 | Howier | 248/394 |
| 3,437,303 | 4/1969 | Pickles | 248/394 |

Primary Examiner—Francis K. Zugel
Attorney, Agent, or Firm—Whittemore, Hulbert & Belknap

[57] ABSTRACT

An adjustable automotive vehicle seat has independent front and rear edge adjusting and supporting means to provide for vertical adjustment of the seat between raised and lowered positions, and for tilt adjustment of the seat between an untilted position and a forwardly tilted position while preventing rearward tilting of the seat. A first control member is operable to provide only downward movement of the front edge of the seat, while a second control member is operable to provide only upward movement of the rear edge of the seat. A third control member is operable to provide either upward or downward movement of both front and rear edges simultaneously. Preferably the adjusting and support means comprises separate motors and the control members are switch operators.

7 Claims, 2 Drawing Figures

SEAT ADJUSTING MECHANISM

Automotive vehicles are commonly provided with automatic or powered seat adjusting mechanisms. In so-called 4-way seat adjusting mechanism the seat is normally adjustable horizontally between forward and rear positions, and also generally vertically adjustable between raised and lowered positions.

In the so-called 6-way adjustable seat mechanism, the front and rear edges of the seat are independently adjustable substantially vertically. Obviously when both front and rear edges are raised, the entire seat is in a raised position. However if only one edge of the seat is either raised or lowered, the result is to tilt the seat forwardly or rearwardly.

In certain modern automobiles of restricted length, rearward tilting of the seat brings about interference between the upper portion of the seat back and body structure of the vehicle. Such rearward tilting of the seat may result from raising the front edge of the seat or lowering the rear edge of the seat or both.

It is desirable to prevent such interferring engagement between body portions of the vehicle and the upper portion of the seat back.

At the same time it has been the usual practice in the so-called 6-way seat adjusters, to provide a composite switch structure including three separately and independently movable control members. In the past one of these comprises a control member movable in opposite directions to produce upward and downward movement of the front edge of the seat. A second movable control member has been provided which is movable in opposite directions to produce upward and downward movement of the rear edge of the seat. A third control member is provided movable in one direction to raise both the front and rear edges of the seat, and movable in the opposite direction to lower both the front and rear edges of the seat.

In accordance with the present invention means are provided which renders the first control member operable only to produce downward movement of the front seat edge. Means are also provided which renders the second control member operable to produce only upward movement of the rear edge of the seat. The third control member produces simultaneous upward or downward movement of both front and rear edges of the seat.

Reference is made to prior Pickles U.S. Pat. No. 3,437,303 illustrating seat adjustment mechanism comprising three separate reversible electric motors. In the system illustrated in this patent one motor is connected to mechanism for adjusting the seat horizontally between forward and rear positions. A second one of the motors is connected to lift mechanism for raising or lowering the front edge of the seat. The third motor is connected to lift mechanism for raising and lowering the rear edge of the seat.

DETAILED DESCRIPTION

The present invention is applicable to either 4-way or 6-way seat adjusters but for convenience may be considered as applied to the control means for the 6-way seat adjusting mechanism described in prior Pickles U.S. Pat. No. 3,437,303.

In power seat adjusters of this type, a switch energizes a reversible motor in the appropriate direction to produce the required adjusting movement of the seat. The switch is normally held in the closed position until the seat reaches a desired intermediate position or alternatively until the seat reaches a limiting position at which time the operator releases the normally open switch.

In the prior Pickles patent a separate reversible motor is connected to independently operable seat adjusting mechanisms, one of which raises and lowers the front edge of the seat, another of which raises and lowers the rear edge of the seat and the third of which effects horizontal adjustment of the seat between forward and rear positions.

Figure 1:
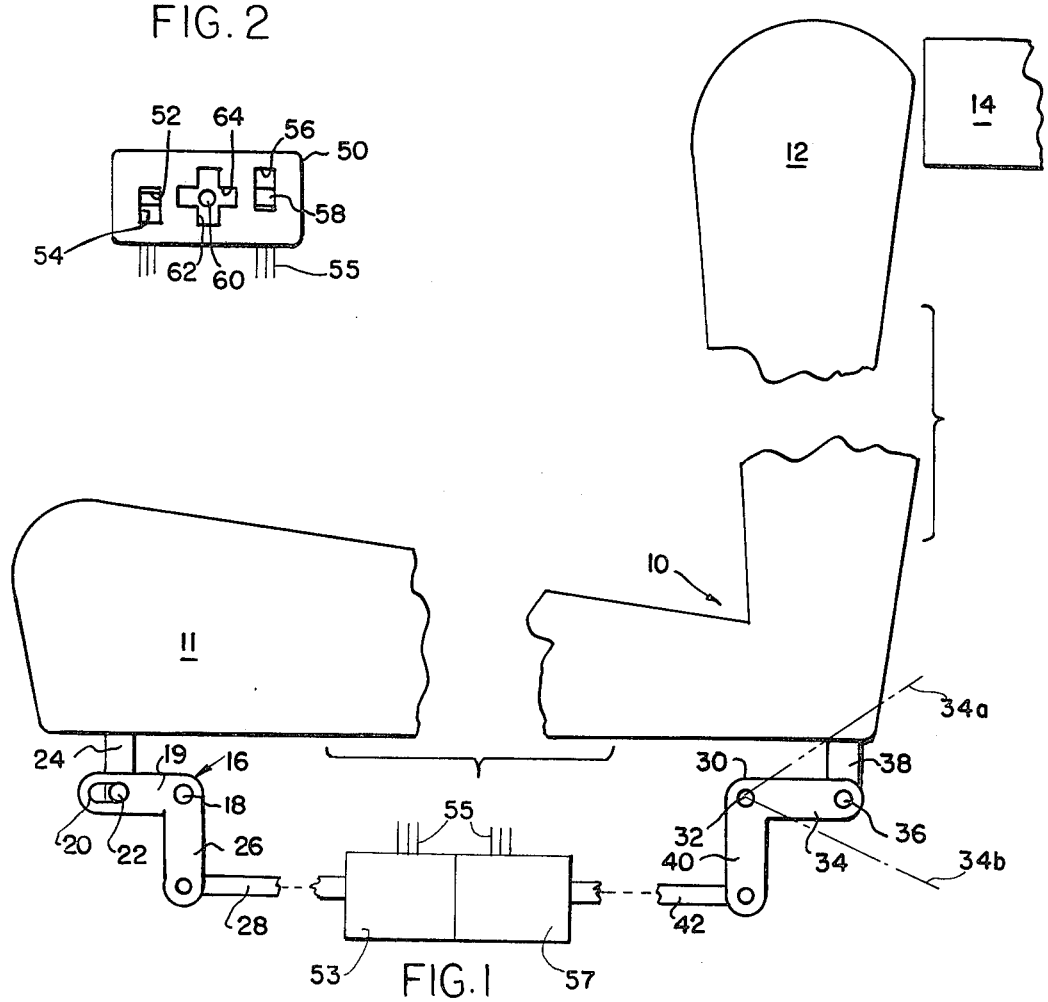
FIG. 1 is a diagrammatical view of a vehicle seat showing independent lift mechanisms connected to the front and rear edges thereof.

Referring now to FIG. 1 the seat structure 10 comprises the main seat portion 11 connected to the seat back portion 12 and in the figure there is diagrammatically illustrated a body portion 14 which is in position to interfere with movement of the upper portion of the seat back 12 if the seat is tilted rearwardly.

In this figure the lift mechanism is illustrated as comprising a front lift bell crank 16 pivoted to a relatively stationary pivot support 18. The bell crank 16 includes a lift arm 19 having an elongated slot 20 which receives a pin 22 carried by a post 24 connected to the front edge of the seat. It will be understood that the elongated slot 20 is provided to prevent binding as for example when the front edge of the seat is raised or lowered while the rear edge remains stationary, or vice versa.

The bell crank 16 includes an actuating arm 26 connected to a rigid link 28 which is movable longitudinally by suitable power mechanism such as motor 53. The bell crank 16 and front edge of seat 11 are illustrated in intermediate position.

A second bell crank 30 is provided pivoted to a relatively stationary pivot support 32 and has a lift arm 34 connected by a pivot connection 36 to a post 38 extending downwardly from the rear edge of the seat. The bell crank includes an actuating arm 40 connected to a rigid link 42 which effects rocking of the bell crank 30 about the relatively fixed pivot support 32. Link 42 is movable longitudinally by motor 57.

It will be understood that pivot supports 18 and 32 may if desired be carried by a horizontally slidable support which provides for adjustment of the seat between forward and rear adjusted positions.

The bell cranks 16 and 30 are shown in intermediate position, but it will be understood that each may be pivoted about its supports 18 and 32 so that the arms 19 and 34 move between limiting raised and lowered positions indicated by the construction lines 34a and 34b for arm 34, and similar positions for arm 19. The limiting positions may be determined by abutments (not shown) engageable by portions of the bell cranks, or links 28 or 42.

Figure 2:
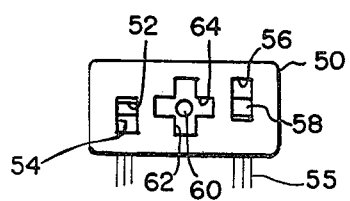
FIG. 2 is a view of a switch control panel.

Referring now to FIG. 2 there is shown a switch control panel 50 which is normally provided at the side of the front seat adjacent the driver's position. This switch panel normally carries a first movable control member 52 which in the past has normally been movable in opposite directions to produce upward or downward movement of the front edge of the seat. As previously suggested this may be by effecting forward or reverse actuation of an electric motor having drive means connected to the actuating rod 28.

In accordance with the present invention the switch control panel 50 is provided with an elongated slot 54 which permits movement of the control member 52 only in one direction from its intermediate inoperative position. The end of the slot illustrated in this figure as adjacent the control member 52 in its illustrated idle or switch open position, constitutes blocking means which prevents upward movement of the control member 52 which would raise the front edge of the seat and thus produce rearward tilting of the seat.

Similarly the panel 50 is provided with an elongated slot 56 which receives a control member or switch operator 58 which similarly controls raising and lowering of the rear edge of the seat. As illustrated in FIG. 2 the slot 56 permits movement of the control member 58 upwardly which corresponds to upward movement of the rear edge of the seat. However, the end of the elongated slot illustrated in FIG. 2 as adjacent the control member 58 in its illustrated idle or switch open position, constitutes blocking means which prevents movement of the control member 58 downwardly which would produce downward movement of the rear edge of the seat with corresponding rearward tilting of the seat.

Intermediate the control members 52 and 58 is a control member 60 which as illustrated is movable vertically in elongated slot 62 or horizontally in elongated slot 64. In this connection upward movement of the control member 60 actuates both of the lift mechanisms, the front edge lift mechanism including the actuating rod 28 and the rear edge lift mechanism including the actuating rod 42. Similarly downward movement of the control member 60 actuates the front and rear edge lift mechanisms in the direction to produce downward movement of the front and rear edges of the seat.

Movement of the control member 60 to the left as seen in FIG. 2 which is normally toward the front of the vehicle, results in actuation of the seat mechanism which produces horizontal adjustment of the seat in a forward direction. Similar movement of the control member 60 to the right as seen in FIG. 2 results in adjustment of the seat toward the rear of the vehicle.

It will of course be understood that the switch structure at panel 50 will comprise conventional reversing contacts suitably connected to motors 53 and 57 by conductors indicated at 55.

It will of course be understood that in the illustrated position of the control members 52, 58 and 60, the adjusting motors are disconnected from the power source.

While the seat adjustments obtained by operation of the control members 52, 58 may be anywhere between the fully raised position and the fully lowered position, it is convenient to consider three adjusted positions of the seat edges as produced by the front and rear edge lift mechanisms as the upper position designated U, the intermediate position designated I, and the lower position designated L.

The possible adjusted positions of the front and rear lift mechanisms are tabulated as follows:

| Position Number | Front Edge | Rear Edge | Tilt |
|---|---|---|---|
| 1. | U | U | none |
| 2. | U | I | rearward |
| 3. | U | L | rearward |
| 4. | I | U | forward |
| 5. | I | I | none |
| 6. | I | L | rearward |
| 7. | L | U | forward |
| 8. | L | I | forward |
| 9. | L | L | none |

From an inspection of the above table it will be noted that the position 1 represents the condition when both the front and rear edges of the seat are in uppermost position. At this time the entire seat is in raised position and is not tilted. In position 2 with the front edge of the seat in an upper position and the rear edge in an intermediate position, the seat would be tilted rearwardly and accordingly interference would exist between the body structure 14 and the upper portion of the seat back 12. In position 3 the condition of position 2 is aggravated in that the seat would be inclined more severely tilted rearwardly than in position 2.

In position 4 the seat is tilted forwardly. In position 5 the seat is not tilted and is in its position of intermediate height. In position 6 the seat is again tilted rearwardly as in positions 2 and 3, so that interference wuth the body part 14 would exist.

In position 7 the seat is given its maximum forward tilt so that no interference exists. In position 8 the seat is tilted forwardly at a smaller angle and again no interference results.

In position 9 the seat is not tilted and is in its lowermost position, at which time no interference exists.

From the foregoing it will be observed that positions 2, 3 and 6 are the positions in which interference exists and which it is desired to avoid.

In general it may be said that interference may exist at any time when the front edge of the seat is at a substantially higher level than the rear edge, so that the seat back inclines rearwardly.

As previously mentioned, power seat adjusters of the type described herein provide mechanical connections between a motor and each of the lift mechanisms, so that when the control member or switch energizes the appropriate motor, vertical movement of the corresponding seat edge continues as long as the switch remains closed until the seat edge reaches a limiting position determined by stop means (not shown). At this time the operator senses no further movement of the seat and promptly opens the switch.

By providing a switch panel of the type disclosed in FIG. 2, use of the conventional switching mechanism is permitted while at the same time movement of the seat into the undesirable interference positions is prevented. Separate downward movement of the front edge of the seat, or upward movement of the rear edge of the seat both produces or increases forward tilting of the seat from any non-interference position.

Since the simultaneous operation of both the front and rear edge lift mechanisms may be employed to effect substantial vertical adjustment of the seat without changing its angle of tilt, the operation of the system under these conditions will be considered. Referring to the above table, positions 2, 3 and 6 will never be attained. With the seat in position 1, downward movement of the control member 60 will result in moving the seat first to position 5 and then to position 9, with of course the option of stopping the adjustment at any desired intermediate position. If the seat is in position 4, downward movement of the control member 60 will effect downward movement of both front and rear edges of the seat until the front edge reaches the lowermost position, at which time, while the motors may remain energized, the front edge adjusting motor will stall when the rear seat edge is in the intermediate position. However the rear seat edge adjusting motor will continue to move the rear seat edge downwardly until it reaches the lowermost position at which time the seat reaches the lowermost untilted position 9.

Similarly if the control member 60 is moved upwardly while the seat is in positions 7 or 8, the front edge of the seat will move upwardly while the rear edge of the seat will stall the rear seat edge adjusting motor until the seat reaches the forwardly tilted position 4 or eventually the upper untilted position 1.

The foregoing permits adjustment of the seat into any non-interference position by appropriate manipulation of the control members 52, 58, 60.

The embodiment of the invention described above has the advantage that it permits the use of standard control switch means and simply disables movement of the switch control members in the direction which would produce the undesired interference between the adjustable seat and a portion of the vehicle. It is also advantageous in that if the operator attempts to raise or lower the front or rear edge of the seat in a movement which would produce interference, actual movement of the control member or switch actuator is prevented which constitutes a signal to the operator that the adjustment is not being made.

However, instead of providing the usual switch control assembly with the blocking means, it will be apparent that substantially equivalent results can be obtained by simply not wiring the appropriate switch contacts and thus forestalling or preventing the undesirable independent upward adjustment of the front edge of the seat or downward adjustment of the rear edge of the seat. In any case, however, the intermediate control member 60 may produce upward movement of the front edge of the seat or downward movement of the rear edge of the seat at any time when such movement is accompanied by corresponding movement of the other edge. In this case of course the angle of tilt is not changed until the front or rear seat edge reaches a limiting position. When this occurs continued operation of the other lift mechanism is permitted to continue until the seat reaches a level or untilted elevated or lowered position.

We claim:

1. A vehicle seat having means for supporting its front and rear edges for independent vertical movement, said means comprising independent front and rear edge lift mechanisms comprising front and rear lift devices for selectively raising and lowering said front and rear seat edges, control means comprising a first movable control member operable to actuate said front edge lift mechanism only in a direction to lower said front edge, a second movable control member operable to actuate said rear edge lift mechanism only in direction to raise said rear edge, and a third control member movable from an intermediate position in one direction to actuate both of said lift mechanisms simultaneously to raise both the front and rear edges of said seat and movable in the opposite direction to actuate both of said lift mechanisms simultaneously to lower both the front and rear edges of said seat in which said lift mechanisms comprise motor means connected to said lift devices and adapted to stall when the corresponding seat edge reaches a limiting raised or lowered position;

displacement of said third control member in either direction from its intermediate position while said seat is in an untilted intermediate position being effective to energize both of said motor means to activate both of said lift devices in the same direction to move said seat vertically without tilting until said seat reaches its limiting untilted raised or lowered position;

displacement of said third control member in either direction from its intermediate position while said seat is in a forwardly tilted intermediate position being effective first to energize both of said motor means to activate both of said lift devices in the same direction to move said seat vertically without changing the angle of tilt until one of said seat edges reaches its upper or lower limiting position and stalls the motor means connected to its lift device, at which time movement of said control member back to its intermediate position deenergizes both of said motor means to leave said seat in forwardly tilted, raised or lowered limiting position;

retention of said third control member in its last mentioned displaced position after stalling of said last mentioned motor means being effective to continue energization of both motor means, the motor means actuating the lift device connected to the seat edge which has reached its limiting position remaining stalled while the other motor means continues to actuate the other lift device until both seat edges are in the same raised or lowered position and said seat assumes a limiting raised or lowered untilted position;

and operation of the appropriate one of said first or second control members while said seat is in a limiting raised or lowered untilted position, or in any position of less than maximum forward tilt being effective to energize the corresponding lift device to lower the front edge or raise the rear edge of the seat, to tilt the seat forwardly.

2. A vehicle seat as defined in claim 1 in which said lift mechanisms comprise separate reversible electric motors, and said control members comprise switch members.

3. A vehicle seat as defined in claim 2, in which said first and second switch operating members are normally movable in opposite direction to activate the associated electric motors to operate their associated lift mechanisms in raising or lowering direction, comprising blocking means preventing movement of said first switch operating member in the direction to energize the motor connected to the front edge lift device to raise the front edge of said seat and blocking means preventing movement of said second switch operating member in the direction to energize the motor connected to the rear edge lift device to lower the rear edge of said seat.

4. Automotive vehicle seat construction comprising a seat having seat and seat back portions adjustable as a unit vertically between upper and lower positions and angularly between untilted and forwardly tilted position, seat supporting and adjusting structure comprising independent front and rear edge lift mechanisms connected respectively to the front and rear edges of said seat and operable to support said seat through a range of vertically adjusted positions and through a range of forwardly tilted adjusted positions while preventing rearward tilting of said seat, said lift mechanisms comprising corresponding front and rear edge reversible electric motors operable when energized to move the seat edge to which they are connected to limiting raised or lowered positions and to stall while maintaining the corresponding seat edges in limiting positions while energized, first control means including a first control member connected to said front edge motor and operable to energize said front edge motor only in the direction to lower the front edge of said seat, second control means including a second control member connected to said rear edge motor operable to energize said rear edge motor only in the direction to raise the rear edge of said seat, and third control means including a third control member connected to both of said motors operable to energize both of said motors simultaneously in the same direction to simultaneously raise or lower both edges of said seat.

5. A construction as defined in claim 4, in which continued energization of both of said motors in consequence of actuation of said third control member results in moving said seat to limiting raised or lowered untilted position.

6. A construction as defined in claim 4, in which each of said control means comprises a normally open switch, and said control members are switch operating members movable manually from a normal switch-open position to a switch-closing position.

7. A construction as defined in claim 6, in which all three of said control members have an open-switch position and forward and reverse positions, blocking means preventing movement of said first control member to the position to energize said front edge motor in edge-lifting direction, and blocking means preventing movement of said second control member to the position to energize said rear edge motor in edge-lowering direction.

* * * * *